United States Patent Office 3,527,803
Patented Sept. 8, 1970

3,527,803
PROCESS FOR THE SEPARATION OF ACRYL-
AMIDE FROM ACRYLAMIDE SULFATE
Fabio B. Bruschtein, Midland, Mich., assignor to The
Dow Chemical Company, Midland, Mich., a corporation of Delaware
No Drawing. Filed Feb. 14, 1968, Ser. No. 705,314
Int. Cl. C07c *103/08*
U.S. Cl. 260—561                           6 Claims

ABSTRACT OF THE DISCLOSURE

Acrylamide is separated from acrylamide sulfate by neutralizing the acrylamide sulfate with a basic sodium compound and precipitating sodium sulfate decahydrate from the reaction mixture at a temperature below about 32° C., preferably below about 20° C. The precipitated solids are then separated to recover a purified and more concentrated aqueous solution of acrylamide. Also by operating at the lower neutralization temperatures detrimental by-products are avoided in the monomer. In a preferred embodiment, acrylamide sulfate containing dissolved iron as an inhibitor is neutralized with a basic sodium compound, the amount of the latter reagent being controlled so as to not exceed pH 3 in the reaction mixture. After precipitating and separating the sodium sulfate decahydrate, the aqueous acrylamide solution is contacted with an agent for separating iron from acidic aqueous solution.

---

The present invention concerns a process for separating acrylamide from acrylamide sulfate to produce relatively concentrated aqueous monomer solution. In a special embodiment, iron inhibited acrylamide sulfate is processed to produce iron-free acrylamide solutions.

A widely practiced method for the preparation of acrylamide involves the sulfuric acid hydrolysis of the nitrile precursor to the desired amide. The resulting sulfate is neutralized with an alkaline material and the acrylamide separated from the neutralization reaction product by crystallization or solvent extraction techniques.

Among neutralizing reagents that have been employed for the separation of acrylamide from acrylamide sulfate are lime, ammonia and the various alkali metal hydroxides, bicarbonates and carbonates. Techniques using these reagents are explored in greater depth in U.S. Pats. 2,683,-173; 2,753,375 and 2,798,887. Although more or less effective for the intended purposes, the processes of the prior art are encumbered with one or more awkard processing parameters. Some of the failings of the lime and ammonia neutralization processes are described in the more recent of the above patents.

The particular improvement set forth in this later patent recognizes, and utilizes to advantage, the differential solubilities of alkali metal sulfates and acrylamide in mutual aqueous solution at higher temperatures. In the described process acrylamide sulfate produced by the hydrolysis of acrylonitrile with sulfuric acid is neutralized with an alkali metal hydroxide or carbonate. Alkali metal sulfate thus produced is effectively precipitated at temperatures above about 15° C. and separated from the reaction mixture to produce an aqueous solution of the desired acrylamide monomer. The monomer solution is then cooled to recover acrylamide crystals. The patent teaches that the solubility of alkali metal sulfates decreases as the temperature is increased and therefore, by working at higher temperatures there is less possibility of sulfate contamination of the monomer as it is crystallized. Although a useful process, the foregoing method yields some detrimental by-products as the result of subjecting the system to higher temperatures.

It is an object of the present invention to provide an improved process for the separation of acrylamide from acrylamide sulfate. Especially, it is an object to efficiently and simultaneously separate water and salt by-products during the neutralization of acrylamide sulfate. A further object is to provide an efficient, low temperature neutralization process for acrylamide sulfate, which produces monomer with less detrimental by-product, e.g. cross-linkers, more common in higher temperature processes. In a special embodiment of the invention, it is a particular object to provide an improved process for separating acrylamide from acrylamide sulfate inhibited with dissolved iron. Further benefits of the instant invention will become apparent hereinafter as the invention is more fully described.

In the instant invention, one of the alkali metal sulfates, i.e. sodium sulfate, as is produced by the neutralization of acrylamide sulfate with a basic sodium compound, was found to form a decahydrate in the presence of acrylamide at temperatures below about 32° C. As the temperature of the system is decreased below about 32° C., the solubility of the decahydrate was found to diminish sharply to very low levels. For instance, at temperatures of about 6° C. the solubility of the decahydrate is less than about 1.1 percent by weight in a 25.4 percent by weight aqueous solution of acrylamide.

An improved process for the separation of acrylamide from acrylamide sulfate was evolved utilizing these properties of sodium sulfate. In accordance with the process, acrylamide sulfate is neutralized with a basic sodium compound and the resulting sodium sulfate decahydrate is precipitated from the reaction mixture at a temperature below about 32° C. Operating in this manner, both water and the neutralization salt by-products are removed in a single processing step.

It is essential to successful operation that the precipitation of the sodium sulfate occur at solution temperatures below 32° C. Otherwise, an anhydrous form of sodium sulfate is formed which will not, when the solution is subsequently reduced to lower temperatures, convert to the decahydrate. Accordingly, care should be taken while neutralizing the acrylamide sulfate to maintain the temperature of the reaction system below about 32° C.

It is a somewhat curious property of sodium sulfate that above 32° C. it readily precipitates as anhydrous salt but at temperatures less than 32° C., at which level the decahydrate forms, the sodium sulfate easily forms a supersaturated solution. Unless precautions are taken to assure precipitation of the sodium sulfate decahydrate it is possible that the low solubility of the decahydrate in acrylamide solution would not be observed. This may explain the erroneous general conclusion in U.S. 2,798,-887 to the effect that the solubility of alkali metal sulfates increase as the temperature is decreased. Although this conclusion is generally true for solutions above 32° C., it does not apply to sodium sulfate decahydrate. As previously indicated, this material decreases sharply in solubility with decreases in temperature below 32° C.

Precipitation of the sodium sulfate decahydrate may be accomplished by any conventional means known to initiate crystallization of a solute in supersaturated solutions thereof. Best results are achieved by seeding the solution with a small amount of crystals of sodium sulfate decahydrate, by which the solution is supersaturated. In large scale practice of the process, a sufficient amount of the decahydrate seeds will remain in the equipment to initiate the desired crystallization of the sodium sulfate decahydrate on successive runs. Preferably, auxiliary seeding of the hydrate solution will be practiced to enhance the rate of solids removal from solution.

Basic sodium compounds useful in the process, include sodium hydroxide, sodium carbonate, sodium bicarbonate, sodium acetate, sodium phosphate and sodium borate. As used herein, the term "basic" means basic relative to acrylamide sulfate, i.e. capable of neutralizing acrylamide sulfate. The amount employed will be essentially chemically stoichiometric to the amount of acrylamide sulfate to be neutralized. Inasmuch as the sodium sulfate decahydrate can be formed in either alkaline or acidic solutions of the monomer maintained at proper temperatures, there is no need for careful control of the hydrogen ion concentration. The neutralized product may range from pH 1 up to as much as pH 12. It will be understood by those skilled in the art that, as the pH approaches either of the aforementioned extremes, some hydrolysis of the acrylamide may occur to produce a mixture of acrylic acid and acrylamide monomers. However, if the acrylamide is to be copolymerized with acrylic acid, such hydrolysis would not be a disadvantage.

In a preferred embodiment of the invention, especially as applied to acrylamide sulfates stabilized with dissolved iron, the amount of basic sodium compound added to the acrylamide sulfate is controlled so as not to exceed a pH of 3 in the neutralization product. In this manner, most of the acrylamide sulfate will be neutralized to produce acrylamide and sodium sulfate decahydrate. Only a small amount of acid will remain to maintain the desired pH level. Under these conditions, the iron will remain soluble in the aqueous monomer solution, thus avoiding contamination of the sodium sulfate precipitate with insoluble ferric hydroxide and filtration problems which attend solid-liquid separations involving this most difficultly filtered material. After separation of the sodium sulfate decahydrate solids, the iron is separated from the acrylamide solution by means of known agents capable of extracting iron from acidic aqueous solution. Although highly effective as a polymerization inhibitor, dissolved iron is most troublesome in subsequent polymerization of the monomer. The monomer is then ready for polymerization or recovery from aqueous solution by recrystallization or solvent extraction techniques.

Suitable for separating iron from acidic solution are the various known cationic exchange resins and chelating resins for soluble ionic species of iron. Specific ion exchange and chelating resins include the weak acid ion exchange resins such as crosslinked polymers of acrylic acid and iminodiacetic acid derivatives of polyvinylbenzene chloride. Further description of such resins and their method of use is set forth in U.S. 2,980,607.

In large scale operations, it is possible to practice the process on a continuous basis. That is, the neutralizing, precipitating and separating steps would be accomplished stagewise in a continuous stream of reactants. Alternately, and most conveniently for the development of the reaction parameters involved, the invention is practiced as a batch process. By this technique, molten acrylamide sulfate, which may be obtained by any of the well known sulfuric acid hydrolyzing techniques for acrylonitrile, is diluted with water. The amount of water used can vary within wide limits. As a minimum, the amount of water should be sufficient to facilitate mixing of the acrylamide sulfate with the neutralizing reagent in a homogeneous system. This will require the addition of at least about 10 weight percent water to the reaction mixture. Such water may be added as such or as a component of a reaction ingredient. The use of larger amounts of water will be limited only by the desired ultimate concentration of acrylamide monomer. By utilizing minimal amounts of water, ultimate monomer concentrations can be obtained with as much as about 40 percent by weight of acrylamide. The addition of water above the minimum required at any stage of the process, of course, reduces the ultimate monomer concentration. Preferably, the basic sodium compound is added as an aqueous solution containing sufficient water, such that with the water of neutralization, the reaction mixture may be readily agitated and cooled.

Preferably the neutralization reaction is carried out at temperatures below about 32° C. but it is only essential for the purposes of the invention that precipitation of the sodium sulfate occur at temperatures lower than 32° C. In other words, it is possible that partial neutralization of the acrylamide sulfate may occur at higher temperatures but significant precipitation should not occur at temperatures above 32° C. Above this temperature the precipitate is anhydrous and thus does not function to remove any water from solution. As indicated above, maximum removals of the sodium sulfate decahydrate will be achieved on cooling the neutralized reaction mass to lower temperatures, e.g. lower than about 20° C., preferably to about 5° C.

The precipitated crystalline sodium sulfate decahydrate can be physically separated from the aqueous acrylamide solution by conventional solid-liquid separation techniques. For example, the monomer may be readily separated from the solids by filtration, centrifugation or simply settling and decantation. Residual monomer may be washed from the hydrated solids by use of a saturated solution of sodium sulfate in water. The wash water can be recycled as make up water for the neutralization reaction system, as may be desirable to give the desired monomer concentration, or used in the preparation of a working solution of the basic sodium compound.

When practicing the preferred embodiment, the partially neutralized acrylamide sulfate at a pH less than about 3 is contacted with an agent for separating soluble iron species from acidic aqueous solution. Preferred for the purpose are the weak acid ion exchange resins.

Further details of the invention are illustrated in the following specific example of the process.

800 grams of molten acrylamide sulfate, which had been prepared by the sulfuric acid hydrolysis of acrylonitrile in the presence of ferrous ions for polymerization inhibition, were added to 400 grams of distilled water. The temperature of the diluted system was maintained at about 35° C. by cooling.

Sodium hydroxide as a 33.3 percent water solution, was then slowly added to the above solution of acrylamide sulfate. During this addition the temperature of the reaction mixture was maintained below about 32° C. The addition of caustic was continued until the mixture reached pH 2. About 400 grams of the sodium hydroxide were added. At this point, any ferric ion present in the mixture is still in solution.

During the neutralization reaction, sodium sulfate was formed, which at the specified temperatures below 32° C. formed the decahydrate. To achieve the desired precipitation of sodium sulfate decahydrate, auxiliary means were employed to initiate crystallization. This was conveniently achieved by added seeds of the desired crystals, i.e. a few particles of sodium sulfate decahydrate.

If desired, however, other means of initiating crystallization from supersaturated solution may be employed. Moreover, in the large scale practice of the invention, it is known that sufficient seeds of the desired crystals remain in equipment such that in succeeding runs the desired precipitation is initiated automatically.

After initiation of hydrate precipitation, the system was cooled to a temperature of about 21° C. At this temperature the aforedescribed mixture produced a solution with about 25 percent by weight dissolved acrylamide.

The precipitated sodium decahydrate crystals were readily separated from the reaction mixture by filtration without interference of ferric hydroxide. The acrylamide solution obtained as a filtrate was then further purified for subsequent polymerization by contacting it with an iron chelating resin to remove the metal ions from acidic aqueous solution. The particular chelating resin used was a crosslinked polyvinyl benzyl chloride which was converted to a chelating resin by reaction with iminodiacetic acid.

From the foregoing, it will be apparent that in the first phase of the process for separating acrylamide from its hydrolyzate precursor, two important objectives are achieved simultaneously, i.e. the removal of the neutralization by-products sodium sulfate and water to simultaneously partially purify and concentrate the aqueous acrylamide. Moreover, the neutralization was performed at lower temperature thereby minimizing the concomitant production of crosslinking by-products. By controlling the pH adjustment during the neutralization reaction, the problems encountered with the precipitation of iron, e.g. coloration and a difficultly filterable slurry of ferric hydroxide are avoided. These problems are of such magnitude that another solution to them resulted in a patentable innovation as taught in U.S. 2,840,611.

It should be understood, however, that in its first embodiment the invention contemplates that neutralization may occur at higher pH levels, e.g. up to a pH 12 or so if desired. In such cases the iron inhibitor may coprecipitate with the sodium sulfate decahydrate, but it does not interfere with the dehydration and concentration aspects of the invention. Such solutions may be centrifuged or treated in accordance with U.S. Pat. 2,840,611 to obviate the difficulty due to the presence of iron hydroxide precipitates.

A more concentrated caustic solution, than that employed above, may lead to only partial utilization of the caustic due to limits on the diffusivity of the caustic in the particular reaction system. In effect, the neutralization product may tend to occlude some of the caustic preventing its efficient contact with further amounts of the acrylamide sulfate to be neutralized. This effect may be counteracted by employing vigorous agitation or by reducing the concentration of caustic to a point at which ordinary mixing produces the uniform reaction.

What is claimed is:

1. A method for separating acrylamide from acrylamide sulfate which comprises:
   reacting the acrylamide sulfate with an aqueous solution of sodium hydroxide, sodium carbonate or sodium bicarbonate, while maintaining the resulting mixture at a temperature below 32° C. to precipitate sodium sulfate decahydrate, and
   separating the sodium sulfate decahydrate from a neutralization product to recover an aqueous solution of acrylamide.

2. A method as in claim 1 wherein the basic sodium compound is sodium hydroxide.

3. A method as in claim 1 wherein the precipitating of sodium sulfate decahydrate is initiated by seeding the reaction mixture with crystals of sodium sulfate decahydrate.

4. A method as in claim 1 and including cooling the neutralization product below 20° C.

5. A method for separating acrylamide from acrylamide sulfate inhibited against polymerization by the presence of dissolved iron which comprises:
   reacting the inhibited acrylamide sulfate with an aqueous solution of sodium hydroxide, sodium carbonate or sodium bicarbonate, the latter being added in an amount not to exceed a pH of about 3, while maintaining the resulting mixture at a temperature below 32° C. to precipitate sodium sulfate decahydrate at a temperature below 32° C., and
   separating the sodium sulfate decahydrate from the remaining liquid neutralization product.

6. A method as in claim 5 and including the additional step of separating iron from the remaining liquid neutralization product at a pH below about 3 by contacting said product with an iron chelating resin.

References Cited

UNITED STATES PATENTS 2,980,607    4/1961    Mock et al. _____ 210—31
3,161,679   12/1964    D'Errico et al. _____ 260—561

ALEX MAZEL, Primary Examiner

R. V. RUSH, Assistant Examiner